UNITED STATES PATENT OFFICE.

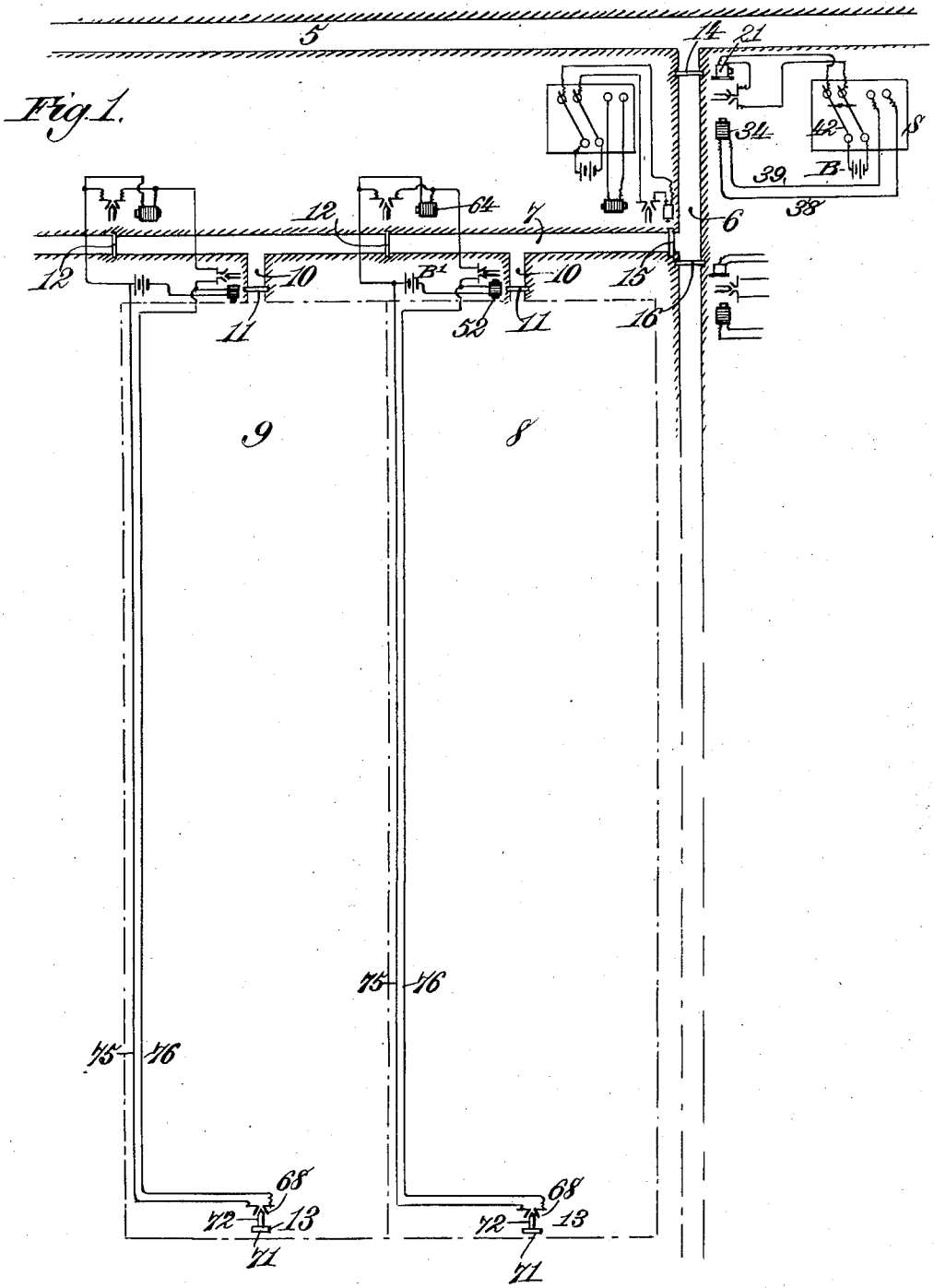

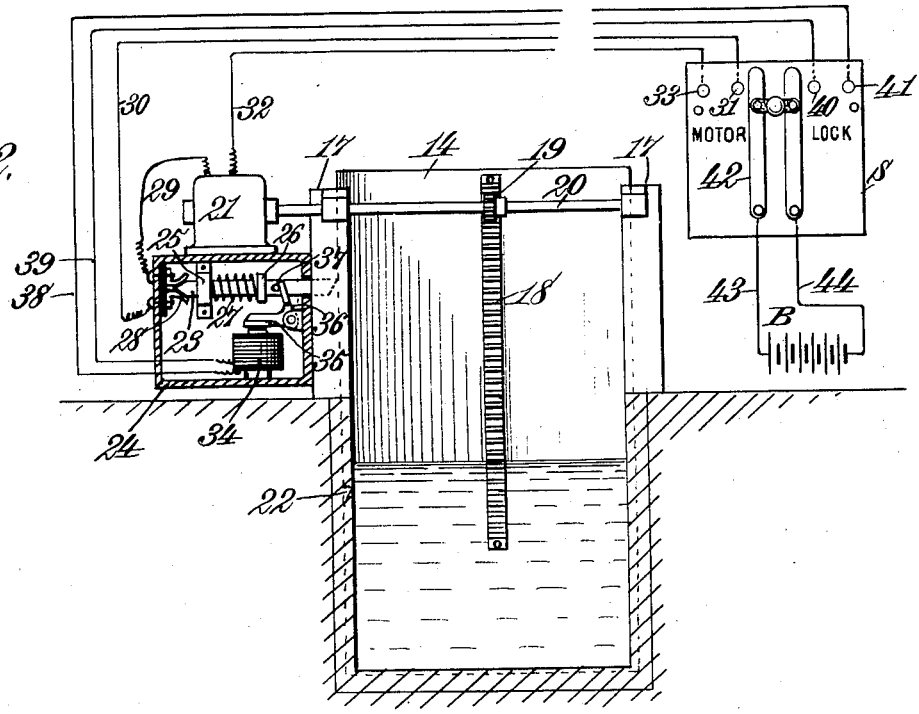
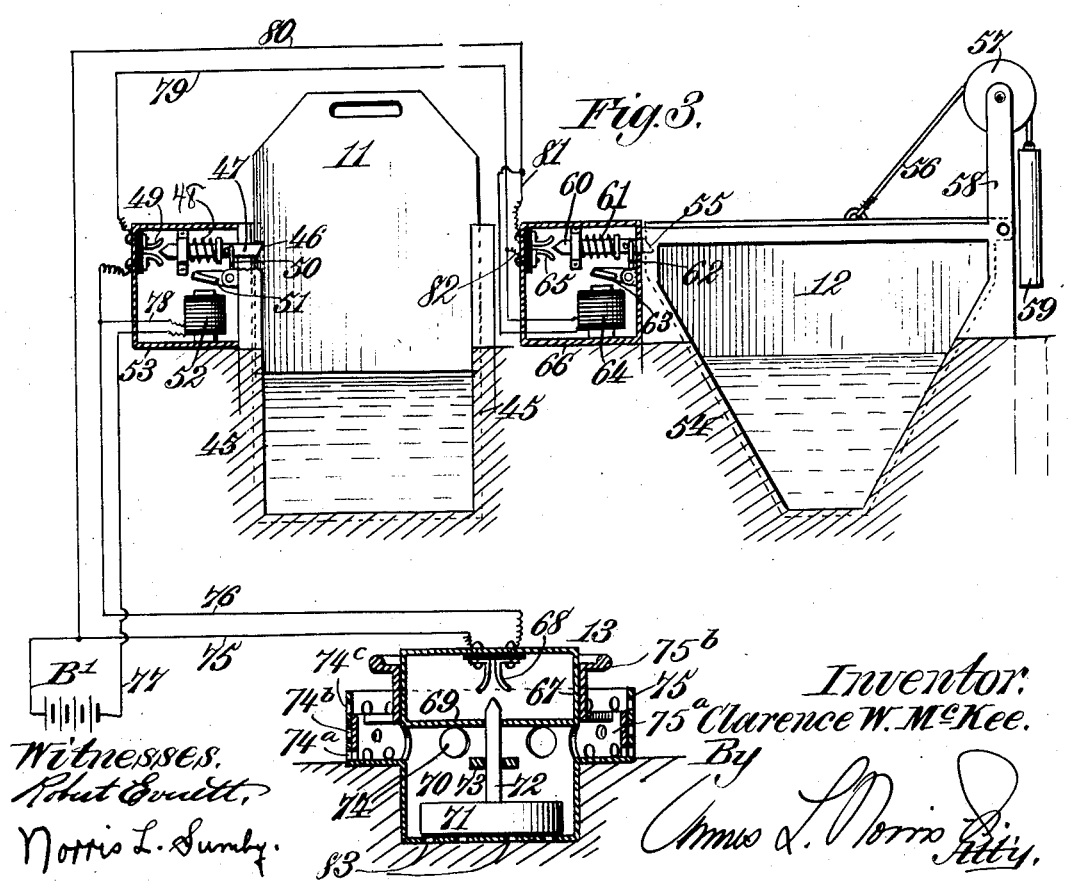

CLARENCE W. McKEE, OF PHOENIX, ARIZONA TERRITORY.

IRRIGATION SYSTEM.

1,018,251.  Specification of Letters Patent.  Patented Feb. 20, 1912.

Application filed May 1, 1911. Serial No. 624,388.

*To all whom it may concern:*

Be it known that I, CLARENCE W. McKEE, a citizen of the United States, residing at Phoenix, in the county of Maricopa and Territory of Arizona, have invented new and useful Improvements in Irrigation Systems, of which the following is a specification.

This invention relates to irrigating systems, and the essential features involved may be used either with a surface flow or with underground pipes.

The primary object of the invention is to provide a simple and effective irrigating system preferably under electric control and applicable to any size of farm or to orchards to successively irrigate sections or divisions of land or orchards from a main source of water supply, such as a canal, sluice, or natural stream, and to insure an automatic cutoff of each section or division when a thorough irrigation thereof has ensued and an instant or simultaneous opening of an adjacent or another section or division to the flow of water and thereby effect a thorough irrigation of each section or division without waste or personal attention of an operator or of the owner except at the point of ingress of the water to the several canals, sluice-ways or races.

The invention consists in the preferred construction and arrangement of the several elements or features which will be more fully hereinafter described and claimed, and for the purpose of illustrating one practical application of the invention a certain organization of the elements or features has been shown in the accompanying drawings, though capable of modifications and variations to adapt the system to use by farmers, fruit raisers, and others on various land and orchard divisions.

In the drawings: Figure 1 is a diagrammatic view illustrating one application of the improved system. Fig. 2 is a diagrammatic view, partially in section and elevation, illustrating one of the head or main controlling gates. Fig. 3 is an elevation, partially in section, of one of the box gates and one of the lateral gates automatically controlled by the box gates, and also illustrating in sectional elevation one of the release floats in electrical circuit with the box and lateral gates.

The numeral 5 designates a source of water supply which may be a natural stream, canal, sluice or conduit of any preferred form, and communicating therewith at intervals to supply land tracts, farms or orchards are races or inlet conduits, one of which is shown as at 6 and having a counter-branch or race 7 adapted to communicate therewith. The counter-branch or race 7 is constructed along abutting extremities of land divisions 8 and 9 which may be portions or sections of a farm, each land division or section adapted to have communication with the race 7 through the medium of an inlet canal or supply race 10 controlled by a box gate 11. In the race 7 between the divisions or sections of land, a number of lateral gates 12 are located and automatically opened by the box gate 11 corresponding thereto when the said box gate is closed. At the extremity of each land division or section opposite that having the inlet race 10 communicating therewith is a saturation controller or float 13 which operates automatically through electrical connections which will be presently described to release the box gates. The flow through the race 6 is controlled by a head gate 14 and communication between the race 6 and branch-race 7 is also under the control of a similar head gate 15. The race 6 may be continued straight or in any other direction beyond the point of communication therewith of the branch-race 7 for irrigating an orchard, for instance, or conveying water to back land divisions or sections, and a head gate 16 similar to the head gates 14 and 15 will be used to control the flow of water through the race 6 beyond the point of communication therewith of the said branch 7.

It is proposed to use gates at all points as above described, preferably under electrical control, the head gates 14, 15 and 16 being automatically opened by closing an electrical circuit and having a self-closing operation when released by a suitable weight; the box gates 11 being primarily opened and set and the lateral gates 12 normally closed and automatically opened when the gates 11 gravitate into closed position through the closing of an electric circuit by each saturation controller or float 13, which is electrically connected to one box gate 11 and the latter similarly connected to one lateral gate 12. The electrical devices or means for controlling the operation of the several gates may be varied at will, but for all practical purposes preferred organizations are illustrated in the drawings and will be specifically described to demonstrate their operation.

Each head gate will be constructed and organized similar to the construction shown by Fig. 2, embodying a gate proper, which for instance may be the gate 14, vertically movable in suitable guides 17 and having a rack 18 vertically applied to one side thereof and engaged by a pinion 19 fixed on a shaft 20 extending from an electric motor 21. In the side edge of the gate 14 adjacent to the motor is a notch or recess 22 for the reception of a locking bolt or slide 23 movably held in a casing 24 mounted adjacent to the gate. The bolt or slide 23 works in a bearing 25 suitably secured to the casing and has thereon a collar 26 between which and the said bearing a spring 27 is interposed and surrounds the bolt and tends to impel the latter forcefully toward the adjacent gate edge. The outer end of the bolt or slide 23 is adapted to engage a contact 28 of suitable forked form and connected by a wire 29 to the motor 21 and also by a wire 30 with a contact 31 of a switch S, the motor 21 having a connecting wire 32 running to a contact 33 of said switch. Below the bolt or slide 23 an electro-magnet 34 is disposed and has an armature 35 coöperating therewith; the said armature being formed with an angular arm 36 which is adapted to engage a projection 37 on the bolt or slide 23 and operating in an automatic manner to draw the bolt backwardly into the position shown by Fig. 3 when the electro-magnet is energized. The electro-magnet 34 is connected by wires 38 and 39 to contacts 40 and 41, respectively, of the switch S, and operatively disposed in relation to the contacts 31 and 33 and 40 and 41 is a switch arm 42 preferably of double form or comprising two members which are individually connected by wires 43 and 44 to the opposite terminals of a battery B or other source of electrical generation. The gate 14 and likewise the similar head gates 15 and 16 are normally closed, and when it is desired to open the gate 14, for instance, the switch arm 42 will be thrown over so that its members engage the contacts 31 and 33, thus sending an electric current to the motor 21 which causes the latter to operate the shaft 20 and pinion 19 and through the rack 18 the gate is raised until the inner end of the bolt or slide 23 is forced into the notch or recess 22 by the spring 27, and when this movement of the bolt is effected the motor circuit is broken in view of the fact that the wire 30 is connected to the contact 28 within the casing 24 and to the contact 31 of the switch, the break ensuing by reason of the fact that the bolt 23 is disengaged when shot inward from the said contact 28. This breaking of the circuit causes an immediate cessation of operation of the motor 21 and the gate 14 will be held open until released. When the bolt 23 is shot inwardly the projection 37 thereon forces the angle arm 36 of the armature 35 inwardly and therefore disposes said armature in position for effective release operation. After the operator has caused an engagement of the switch arm with the contacts 31 and 33 it is unnecessary for him to release the arm from said contacts owing to the automatic breaking of the motor circuit as just explained. When sufficient water has been permitted to run into the race 6 for irrigating the land divisions or sections or orchards, as the case may be, the release of the gate 14 or either of the gates 15 and 16, if the latter have been opened, is accomplished by throwing the switch lever or arm 42 over to cause the members thereof to engage the contacts 40 and 41, thereby energizing the electro-magnet 34 and drawing the armature 35 forcefully toward the said electro-magnet and withdrawing the bolt or slide 23 from the gate notch or recess 22. Each of the gates 14, 15 and 16 will be suitably weighted or have a structural weight sufficient to cause it to gravitate and positively close when released, and in moving downwardly the gate 14 will turn the pinion 19 and shaft 20 in reverse directions relatively to their elevating operation, such reverse movement of the shaft 20 being permitted in view of the fact that there is no current on the motor 21 at the time the release of the gate takes place. The gate 14 after closing will be in condition for further automatic opening movement through the actuation of the switch lever or arm 42 as first explained.

The foregoing structure and electrical organization may be modified at will and it will be understood that the switch S may be located at any point distant from the land or orchard to be irrigated and likewise the similar switches controlling the gates 15 and 16 may be disposed at points distant from the said gates and all of the switches will in practice be arranged upon a single switch-board.

The box gates, lateral gates and saturation controllers or floats are grouped in any suitable manner, and as shown by Fig. 3 are interdependent to effect a reliable irrigation of each land division, section or orchard tract.

Each box gate 11 is vertically movable in suitable guides 45 and is provided in one edge with a notch or recess 46 for engagement by a bolt or slide 47 which is engaged by a spring 48 acting to force the said bolt inwardly. The bolt or slide 47 coöperates with a contact 49 similar to the contact 28 heretofore described and is also engaged by the angle arm 50 of an armature 51 similar to the armature 35 and arm 36 operating in connection with the head gate 14. The armature 51 is operatively associated with an electro-magnet 52, the said electro-magnet, bolt or slide 47, contact 49 and armature 51 being mounted in a suitable casing 53 supported by or adjacent to one of the guides 45. Each lateral gate 12 is movable in suitable guide means 54 and has a notch 55 in one edge, and attached to the top of this gate by a cord 56 passing over a pulley 57 on an upright 58 is a weight 59 which operates to automatically open the said gate when released. A bolt or slide 60 engaged by a spring 61 is normally forced into the notch 55 and is drawn backwardly or outwardly to release the gate 12 by the angle arm 62 of an armature 63 operatively associated with an electro-magnet 64. The bolt or slide 60 coöperates with a contact 65 and the latter together with the bolt, armature 63, and electro-magnet 64 are mounted in a suitable casing 66 adjacent to one side of the guide means 54 for the gate 12. From the foregoing it will be seen that each of the head gates and box gates is provided with means for locking the same open, and each of the lateral gates is provided with means for locking the same closed, all of the gate locks having means for automatically releasing the same. The head gates 14, 15 and 16 and the lateral gates 12 are normally closed, whereas, the box gates 11 are normally open and are manually lifted to open position prior to the entrance of water into the race 7 and are held open by the bolts 47 engaging in the notches 46 thereof.

The saturation controller or float 13 comprises a casing 67 having a forked or bifurcated contact 68 secured to the top thereof and interiorly divided by a horizontal partition 69 to form a lower float chamber 70 having a float 71 mounted therein and provided with a stem 72 movable through a guide 73 and the partition 69. The upper part of the float chamber 70 is formed with a plurality of openings 74 and surrounding the casing 67 and having its bottom coincident with the lower portions of the openings 74 is a guard 75, the bottom of the said guard resting on the ground surface and having therein a plurality of openings 74$^a$, 74$^b$ and 74$^c$ at different elevations, said openings being disposed at a suitable distance above the ground surface so that when a certain degree of saturation of the ground is effected the water will run into the chamber 70 and gradually elevate the float 71 and cause the stem 72 to engage the contact 68. The openings 74$^a$ in the guard 75 are located close to the ground surface and the openings 74$^b$ and 74$^c$ are successively located above the said openings 74$^a$, the open and closed condition of the openings 74$^a$ and 74$^b$ being controlled by a suitably apertured valve slide 75$^a$ operated by a turn-head 75$^b$, the valve slide 75$^a$ being rotatably shiftable through the medium of said head. When a light saturation or irrigation of the ground or tract is desired, the openings 74$^a$ are left uncovered and when a greater degree of irrigation is desired the openings 74$^a$ are closed and the openings 74$^b$ are uncovered, and when a maximum irrigation of the ground or tract is desired, the openings 74$^a$ and 74$^b$ are closed so as to force the water to rise to the openings 74$^c$. By this means the degree of saturation of the ground or tract may be conveniently controlled.

All of the contacts 28, 49, 65 and 68 are circuit makers or breakers and the movable devices, such as the bolts and float stem, either open or close the circuits in which the said contacts are included. The members of the contact 68 are respectively connected by wires 75 and 76 to one pole of a battery B' and to one of the members of the contact 49 of each box gate 11. The remaining pole of the battery B' is connected by a wire 77 to one of the wire terminals of the electro-magnet 52, the opposite wire terminal of said electro-magnet being connected by a wire 78 to the wire 76. The remaining member of the contact 49 is connected by a wire 79 with one terminal of the electro-magnet 64 coöperating with the nearest lateral gate 12, and the remaining terminal of said electro-magnet 64 is connected by a wire 80 with the wire 75 running to the battery B'. A branch wire 81 also connects the wire 80 to one member of the contacts 65 and the remaining contact member of said contact 65 is connected by a wire 82 with the wire 79.

Assuming that the box gates 11 have been manually set or opened and the lateral gates 12 are in their normal condition or closed, the head gates 14 and 15 are opened and the water flows into the branch 7 from the supply source 5 and is forced to flow into the inlet canal or race 10 by reason of the fact that the first lateral gate is closed and after the division or section 8 has become thoroughly irrigated or saturated, the water gradually flows into the chamber 70 of the saturation controller and the float is elevated, and finally the upper end of the stem 72 closes the members of the contact 68 and energizes the electro-magnet 52, thus causing the armature 51 to be drawn toward the said electro-magnet and withdrawing the bolt or slide 47 from the notch 46 of the gate 11, when the latter will immediately close by gravity and at the same time the bolt 47 completes the circuit of the electro-magnet 64 by engaging the members of the contact 49, thereby causing said magnet to be energized. The moment that the electro-magnet 64 is energized, it draws its armature 63 and releases the bolt 60 from engagement with the gate 12 and permits the latter to be automatically raised or opened by the weight 59, thus permitting the water to flow to the next inlet canal or race 10 for irrigating the division or section 9. The circuits and electrical devices controlling the locks of the gates 11 and 12 will remain closed as long as the stem 72 of the float 71 engages the contact members of the contact 68 so as to insure a reliable operation of the said gates 11 and 12 as desired. The water collected in the chamber 70 of the saturation controller will, however, gradually leak through suitable openings 83 in the bottom of said chamber and the float 71 will consequently descend and break the circuit including the battery B′ and thereby deënergize the electro-magnets 52 and 64 and cause the bolts 47 and 60 to be relieved of the pressure influence of the armatures 51 and 63, and under these conditions when the gates 11 are manually opened the bolts 47 will lock the same, as shown by Fig. 3, and when the gates 12 are manually closed the bolts 60 will likewise be forced into locking position relatively thereto.

From the foregoing it will be seen that land sections or divisions may be regularly and positively irrigated, and that irrigation under the system involving the invention may be effected either close to or at a distance from a source of supply without waste of water or material manual attention owing to the automatic action and the electrical control of the apparatus. It will also be seen that the race 7 may be cut off by closing the head gate 15, the head gate 16 opened to allow the water to flow through the continuation of the race 6 to an orchard or land sections in other positions which will be supplied with the same form of box gates and saturation controllers as hereinbefore described.

What is claimed as new is:

1. In an irrigating system, the combination with a source of supply, of a land division with an inlet at one extremity having a normally open gravitating box gate therein, a race between the source of supply and said inlet, a saturation controller in the land division at a point distant from the said box gate, and means automatically operated by the controller to effect a release of the said box gate to permit the latter to close.

2. In an irrigating system, the combination with a source of supply, of a land division with an inlet at one extremity having normally open gravitating means for automatically closing the inlet, and a saturation controller at a point distant from the inlet and provided with means for releasing said automatic closing means.

3. In an irrigating system, the combination with a source of supply, a land division with an inlet at one extremity communicating with the source of supply, a normally open gravitating gate in said inlet, and a saturation controller in the land division at a point distant from the gate and automatically operating to release the latter after a certain degree of saturation of the land with water to permit the gate to close and shut off the inlet of water to the land division.

4. In an irrigating system, the combination with a source of supply, of a land division having an inlet at one extremity, a race between the source of supply and said inlet provided with an automatically opening and closing head gate, a normally open gravitating gate in said inlet, and a saturation controller in the land division at a point distant from the inlet gate and automatically operating to release and permit said inlet gate to close after a certain degree of saturation of the land to control the inlet of water to the land division.

5. In an irrigating system, the combination with a source of supply having a race communicating therewith, of land divisions with inlets communicating with different portions of said race, normally open gravitating closing gates for the inlets, normally closed automatically opening gates in the race between the land divisions, and saturation controllers at points distant from the said inlets and provided with means for releasing the respective inlet gates and permitting the latter to close.

6. In an irrigating system, the combination with a source of supply having a race communicating therewith, of land divisions having inlets communicating with the race, automatically closing gates for the inlets having means for locking the same in open position, lateral gates in the race between the land divisions automatically released by the release of the locking means for the said inlet gates, and a saturation controller in each land division at a point distant from the inlet and provided with means for releasing the locking means for the respective inlet gate.

7. In an irrigating system, the combination with a source of supply having a race communicating therewith, of land divisions having inlets communicating with the race, automatically operating normally open closing means for the inlets, normally closed lateral gates in the race between the land divisons automatically released successively by the release of the closing means for the said inlets, locking devices for the said closing means and lateral gates, and saturation controllers at points distant from the said inlets and provided with means for releasing the locking devices of the respective inlet closing means.

In testimony whereof I have hereunto set my hand in presence of two subscribing witnesses.

CLARENCE W. McKEE.

Witnesses:
FLORENCE HANCOCK,
JEFF D. BATES.